United States Patent
Dean

(10) Patent No.: US 9,370,906 B2
(45) Date of Patent: Jun. 21, 2016

(54) METHODS, DEVICES, AND SYSTEMS FOR INJECTION MOLDING CONTACT LENSES

(75) Inventor: Gregg A. Dean, Hampshire (GB)

(73) Assignee: CooperVision International Holding Company, LP, St. Michael (BB)

( * ) Notice: Subject to any disclaimer, the term of this patent is extended or adjusted under 35 U.S.C. 154(b) by 307 days.

(21) Appl. No.: 13/704,538

(22) PCT Filed: Jun. 8, 2011

(86) PCT No.: PCT/US2011/039663
§ 371 (c)(1),
(2), (4) Date: Feb. 8, 2013

(87) PCT Pub. No.: WO2011/162958
PCT Pub. Date: Dec. 29, 2011

(65) Prior Publication Data
US 2013/0188123 A1    Jul. 25, 2013

Related U.S. Application Data

(60) Provisional application No. 61/357,371, filed on Jun. 22, 2010.

(51) Int. Cl.
*B29D 11/00* (2006.01)
*B29C 45/00* (2006.01)
(Continued)

(52) U.S. Cl.
CPC ...... *B29D 11/00067* (2013.01); *B29C 45/0025* (2013.01); *B29C 67/246* (2013.01); *B29D 11/00125* (2013.01); *B29D 11/00557* (2013.01); *G02C 7/021* (2013.01); *G02C 7/04* (2013.01);
*G02C 7/049* (2013.01); *B29C 45/2708* (2013.01); *B29C 2045/0027* (2013.01); *B29L 2011/0041* (2013.01)

(58) Field of Classification Search
CPC ............ B29D 11/00067; B29D 11/00125; B29D 11/00557; B29C 45/0025; B29C 67/246; B29C 45/2708
USPC .............. 264/1.1, 2.5, 2.6; 425/808
See application file for complete search history.

(56) References Cited

U.S. PATENT DOCUMENTS 5,632,936 A * 5/1997 Su et al. .................. 264/2.5
6,772,988 B2   8/2004 Altmann
(Continued)

OTHER PUBLICATIONS

International Search Report completed Feb. 17, 2012 and mailed Feb. 21, 2012 from corresponding International Application No. PCT/US2011/039663 filed Jun. 8, 2011 (3 pages).
(Continued)

*Primary Examiner* — Mathieu Vargot
(74) *Attorney, Agent, or Firm* — Klein, O'Neil & Singh, LLP

(57) ABSTRACT

Methods, devices, and systems for manufacturing ophthalmic lenses using direct injection molding are described. The present methods, devices, and systems include a mold block having a first mold insert and a second mold insert defining a lens-shaped cavity between them. A raised non-uniform region that projects into the lens-shaped cavity is incorporated in a peripheral zone of the molding surface of at least one of the mold inserts. When an ophthalmic lens is formed using the described mold block, at least one depression is produced in the lens. A gate placed at the non-uniform region allows the depression to hide any gate witness that may form when the mold is closed or separated.

14 Claims, 5 Drawing Sheets

(51) Int. Cl.
*B29C 67/24* (2006.01)
*G02C 7/02* (2006.01)
*G02C 7/04* (2006.01)
*B29C 45/27* (2006.01)
*B29L 11/00* (2006.01)

(56) References Cited

U.S. PATENT DOCUMENTS

2001/0013921 A1* 8/2001 Wu et al. .................. 351/160 R
2007/0035049 A1 2/2007 Bruce et al.
2009/0059166 A1 3/2009 Suzuki et al.
2009/0303432 A1 12/2009 Suzuki et al.
2011/0062607 A1* 3/2011 Clements et al. .............. 264/2.6

OTHER PUBLICATIONS

Written Opinion completed Feb. 17, 2012 and mailed Feb. 21, 2012 from corresponding International Application No. PCT/US2011/039663 filed Jun. 8, 2011 (4 pages).

* cited by examiner

METHODS, DEVICES, AND SYSTEMS FOR INJECTION MOLDING CONTACT LENSES

Methods, devices, and systems for manufacturing ophthalmic lenses by direct injection molding are generally discussed herein, with particular discussions extended to contact lenses produced by directly injecting a lens forming composition into a lens-shaped cavity in a mold, the lens-shaped cavity having a non-uniform region such as a protrusion, projection or raised bump forming part of the molding surface. The non-uniform region in the lens forming surface forms a depression, well or recess in a peripheral zone of the ophthalmic lens molded in the lens-shaped cavity.

BACKGROUND

Reaction injection molding (RIM) is a process where reactive liquid components, such as a lens forming reactive polymerizable composition, are mixed, injected into a mold, and polymerized to form a plastic article. With a reactive polymerizable composition, no external curing by ultraviolet light, heat or the like is required. The article cures as a result of the chemical reaction of the liquid components in the reactive polymerizable composition. In a closed mold environment, the mold cavity components are mated prior to dosing of the reactive polymerizable composition into the mold cavity. The dosing is typically performed by a molding machine feeding the reactive polymerizable composition through a sprue, manifold or runner, and then through a gate or port for injecting the reactive polymerizable composition under pressure into the mold cavity. An outlet for run-off of excess polymerizable composition and venting for gases produced during the polymerization are typically provided within the mold cavity.

Direct injection molded ophthalmic lenses may also be made from a lens forming polymerizable composition, such as a silicone hydrogel lens forming polymerizable composition, including the silicone hydrogel lens forming polymerizable compositions disclosed in US Pub. No. 2009/0264553, entitled WETTABLE SILICONE HYDROGEL CONTACT LENSES AND RELATED COMPOSITIONS AND METHODS, filed Jul. 1, 2009, the contents of which are expressly incorporated herein by reference for all purposes. In direct injection molding using a polymerizable composition, the polymerizable composition may be injected into the mold cavity and then exposed to thermal radiation; actinic light, including UV and visible light; or other forms of radiation effective to polymerize the composition while the composition is present in the mold cavity. Alternatively or in addition thereto, the polymerizable composition can be heated in the injection unit of the injection molding machine and then injected into the mold cavity, for example to allow the polymerizable composition to flow into the mold cavity. For thermally cured polymerizable compositions, depending on the temperature of the injected polymerizable composition as it exits the barrel section of the injection molding machine, additional heating may be needed at or within the mold cavity to facilitate curing.

Direct injection molded ophthalmic lenses can also be made from a lens forming polymer composition, such as a thermoplastic or thermosetting polymeric material. In direct injection molding using a polymer composition, the polymer composition is first heated in the injection unit of the molding machine to allow the polymer material to flow or be injected into the mold cavity, and then injected into the mold cavity and cooled to solidify the composition in the shape of the mold cavity. Depending on the temperature of the injected polymer composition as it exits the barrel section of the injection molding machine, additional heating may be needed in the mold cavity to ensure the polymer composition can adequately flow into all the regions of the mold cavity.

As used herein, direct injection molding is understood to mean injection through a flow or fluid channel to deposit a lens forming composition into a lens forming cavity. The lens forming composition can comprise a lens forming reactive polymerizable composition, e.g., a lens forming reactive polymerizable composition not requiring the addition of thermal radiation or light to polymerize; a lens forming polymerizable composition, e.g., a lens forming polymerizable composition requiring the addition of radiation to polymerize; or a lens forming polymer composition, e.g., a lens forming polymer composition that is already polymerized but requires the addition of heat to be molded, such as a lens forming thermosetting polymer composition or a lens forming thermoplastic polymer composition.

With RIM using a lens forming reactive polymerizable composition, and standard injection molding using a lens forming polymerizable composition or a lens forming polymer composition, the lens forming composition is made to flow into the mold cavity through a gate, typically located on the side wall of the lens mold. Consequently, when the lens forming composition polymerizes or sets, a small amount of material can be left behind. This material left behind is referred to as a gate witness. The gate witness may be raised above the molded surface, may result in a rough area on the surface on the molded item near the location of the gate, or may both be raised above the molded surface and result in a rough area on the surface of the item. Alternatively, a gate pin may be used, which can result in a recess in the molded surface. The recess formed by the gate pin may result in the presence of a rough area on the surface on the molded item near the location of the gate pin, or may result in both a recess and a rough area on the surface of the molded item. In order to provide an ophthalmically acceptable surface, the gate witness, the recess, the rough area on the molded item, or combinations thereof, must later be treated, for example, by removing material or smoothing the cured lens, adding process steps that can be time consuming, can produce lens defects, can lower yield, and thus can increase overall production costs.

SUMMARY

In one embodiment, the present disclosure is directed to a method of manufacturing a contact lens, the method comprising: providing a first mold insert comprising a body section: said first mold insert comprising a lens forming surface including a raised non-uniform region having an opening formed through the lens forming surface in the location of the raised non-uniform region, and a fluid channel passing through the body section and in fluid communication with the opening; placing the first mold insert into a mold block so that the lens forming surface of the first mold insert and the raised non-uniform region form part of a lens-shaped cavity; providing a lens forming composition through the fluid channel and the opening so that an amount of the lens forming composition is deposited in the lens-shaped cavity; allowing the lens forming composition to form a contact lens body retaining the shape of the lens-shaped cavity; removing the contact lens body from the mold block and the mold insert; washing the contact lens body; inspecting the contact lens body; placing the contact lens body in a package with a packaging solution; sealing the package containing the contact lens body and the packaging solution; and sterilizing the package containing the contact lens body and the packaging solution to produce a finished contact lens.

In one example, of the method of manufacturing a contact lens, the raised non-uniform region of the first mold insert is configured to form a depression in a peripheral zone of a contact lens body.

In another example, method of manufacturing can be a method of manufacturing a silicone hydrogel contact lens. In one particular example, when the method is a method of manufacturing a silicone hydrogel contact lens, the step of washing the contact lens body can comprise cleaning the contact lens body, extracting the contact lens body, hydrating the contact lens body, and combinations thereof, using an aqueous solution free of a volatile alcohol.

In another embodiment, the present disclosure is directed to a method for forming an ophthalmic lens through direct injection molding comprising: forming a first mold insert comprising a body section; said first mold insert comprising a lens forming surface including a raised non-uniform region in a peripheral zone of the lens forming surface, the raised non-uniform region having an opening formed through the lens forming surface in the location of the raised non-uniform region, and a fluid channel passing through the body section and in fluid communication with the opening; placing the first mold insert into a mold block so that the lens forming surface of the first mold insert and the raised non-uniform region form part of a lens-shaped cavity; providing a lens forming composition through the fluid channel and the opening so that an amount of the lens forming composition is deposited in the lens-shaped cavity; and allowing the lens forming composition to cure, polymerize or set to form a lens body retaining the shape of the lens-shaped cavity.

In one example of the method of forming an ophthalmic lens, the lens forming composition can comprise a lens forming reactive polymerizable composition, a lens forming polymerizable composition, or a lens forming polymer composition. In one particular example, the lens forming composition can comprise a silicone hydrogel lens forming composition.

In another example of the method, the step of allowing the lens forming composition to cure, polymerize or set can further comprise forming a depression on the exterior surface of the lens body, the depression being the negative of the non-uniform region. The step of providing a lens forming composition through the fluid channel and the opening, or the step of allowing the lens forming composition to cure, polymerize or set, can further comprise forming an irregular area on a side or a bottom of the depression. In one particular example, the exterior surface of the lens body is more ophthalmically acceptable than an exterior surface of the lens body formed in a lens-shaped cavity without the raised non-uniform region, and without forming the depression on the exterior surface of the lens body but having the irregular area located directly on the front or back curve surface of the lens body.

In another embodiment, the present disclosure is directed to an ophthalmic lens comprising a lens body, a front curve surface, a back curve surface, an optical zone, and a peripheral zone, wherein a depression comprising a depression bottom surface is located in the peripheral zone and the depression bottom surface is recessed from either the front curve surface or the back curve surface.

In one example, the ophthalmic lens further comprises an irregular area located within the depression. The irregular area can be formed during the step of providing a lens forming composition through the fluid channel and the opening, or during the step of allowing the lens forming composition to cure, polymerize or set. The depression, irregular area, or both the depression and the irregular area can be used to form an orientation mark, an inversion mark, a diagnostic mark, or an identifying mark on the lens.

In another example, the ophthalmic lens is formed from a lens forming composition. The lens forming composition can comprise a lens forming reactive polymerizable composition, a lens forming polymerizable composition, or a lens forming polymer composition. The lens body can comprise a silicone hydrogel contact lens body.

In another embodiment, the present disclosure is directed to an ophthalmic mold insert for direct injection molding, comprising: a body section comprising a lens forming surface, the lens forming surface comprising an optic zone forming surface and a peripheral zone forming surface, a raised non-uniform region located in the peripheral zone forming surface, the raised non-uniform region having an opening formed through the lens forming surface and a fluid channel passing through the body section and in fluid communication with the opening, wherein the raised non-uniform region is configured to form a depression on an exterior surface of an ophthalmic lens body when the ophthalmic mold insert is used to mold an ophthalmic lens body.

In yet another embodiment, the present disclosure is directed to a system for producing an ophthalmic lens through direct injection molding comprising: a first mold insert comprising a body section; said first mold insert comprising a lens forming surface, at least one raised non-uniform region on the lens forming surface having an opening formed through the lens forming surface, and a fluid channel passing through the body section and in fluid communication with the opening; a mold block for retaining the first mold insert and a companion lens forming surface so that a lens-shaped cavity is defined by the lens forming surface of the first mold insert and the companion lens forming surface; a gate pin comprising a pin shaft and a pin tip located, at least in part, in the fluid channel for closing the opening on the projection. In one example of the system, the pin tip of the gate pin can comprise a raised projection configured to form a recess in a depression formed in a lens body molded using the system.

Soft ophthalmic lenses, such as hydrogel contact lenses, including silicone hydrogel contact lenses, methods of manufacturing soft ophthalmic lenses, systems for manufacturing soft ophthalmic lenses, mold inserts for molding soft ophthalmic lenses, and methods of manufacturing the lens mold inserts are herein described. Utilizing the present methods, systems and ophthalmic lens mold inserts, it is possible to produce an ophthalmic lens by direct injection molding and create a depression, well or recess on a surface of the ophthalmic lens that minimizes, eliminates, or hides an irregular area such as a gate witness, a recess, or a rough area that may form on the lens during the molding process, for example when the mold closes during the injection process. The irregular area formed on the lens during the molding process is minimized, eliminated or hidden by placing it at the bottom or on the side of a depression that penetrates from a surface of the ophthalmic lens into the bulk of the lens (i.e., does not penetrate through the entire thickness of the lens). The depression can be located in a peripheral zone (i.e., not an optic zone) of the lens, for example, on an anterior or posterior surface of the lens in a region of the lens between the center optic zone and the edge of the lens. In other words, the depression is not located along an edge of the lens, but is located on an anterior or posterior surface of the lens. The depression is configured to contain the irregular area formed on the lens during molding so that the uppermost part(s) of the irregular area remain within the depression and below the surface of the remainder of the lens surface (i.e., the anterior or posterior surface of the lens). By placing the irregular area in such a depression, the irregular area does not come into contact with the surface of the eye or the eyelid during normal wear of the lens. Utilizing the present methods and devices can reduce or eliminate the need to perform post-molding manipulation or secondary operations on the lens, such as ablating lens material by laser or by mechanical means to remove or smooth an irregular area such as a gate witness, recess or rough area formed during the molding process, for example at the location where the lens forming composition is injected into the lens forming cavity. Although examples of the present invention are discussed below with reference to a single cavity mold block, a multi-cavity mold block for simultaneously injecting multiple cavities with lens forming compositions (e.g., lens forming reactive polymerizable compositions, lens forming polymerizable compositions, or lens forming polymer compositions) is within the purview of the present invention.

The present methods, devices, and assemblies are effective in mass producing ophthalmic lenses by direct injection molding. By manufacturing lens mold inserts to create a lens forming cavity having a raised non-uniform region such as a raised protrusion, projection or bump at the location of the gate, a lens produced therefrom will have a negative image of the raised non-uniform region that manifests as a depression, well or recess at the location of the gate, where an irregular area such as a gate witness, recess or rough area will occur. The depression at the location of the gate can serve to conceal all or part of a gate vestige or witness, conceal all or part of a recess formed by using a gate pin having a projection, or conceal a rough area formed by the molding process. By placing the irregular area in the depression, the irregular area will be located below the surface of the lens so that the irregular area of the lens will not directly contact the surface of the eye or of the eyelid during wear. In such an example, the depression in the lens surface is configured (i.e., sized, shaped, placed or combinations thereof) to be effective in making the presence of an irregular area more ophthalmically acceptable, and the raised non-uniform region on the mold insert is configured to form a depression that is effective in making the presence of an irregular area more ophthalmically acceptable. Further, by selecting an appropriate gate type, the gate witness can automatically be trimmed, smoothed and be recessed within the depression without the need for performing any secondary operations on the cured or solidified lens body in order to provide an ophthalmically acceptably smooth surface on the lens. Examples of gate types that are usable with the present mold inserts include pin gates, hot runner gates, and valve gates. Optionally, a secondary operation can be performed on the lens which makes use of the irregular area, such as a rough area, depression, gate witness, or combination thereof created in the lens body during the molding process. For example, the irregular area may be incorporated into a mark on the lens, such as an orientation mark, an inversion mark, a diagnostic mark, or a mark for branding.

In one example, a lens mold insert is provided comprising a fluid channel and a raised non-uniform region, such as, for example, a raised protrusion, projection or bump. The raised non-uniform region includes an opening and the fluid channel may be operationally placed in fluid communication with the opening. The mold insert with the raised non-uniform region can be combined with at least one other mold insert (with or without additional non-uniform region(s)) to create a lens forming cavity having the raised non-uniform region forming part of the cavity. The raised non-uniform region can be located in a region of the mold insert used to mold a peripheral zone of a lens so that the raised non-uniform region is not part of the region of the mold insert used to mold an optic zone of a lens, and is spaced away from the edge of the lens.

In another example, an ophthalmic lens is formed from the lens mold insert, mold section or mold member with a raised non-uniform region, so that the lens has a depression formed thereon by the raised non-uniform region on the mold insert. The depression can be located on the anterior or posterior surface of the ophthalmic lens. The depression is located in the peripheral zone of the formed lens so that the presence of the depression is not within the optic zone of the lens and thus does not interfere with the optical quality of the lens. The depression may contain all or part of an irregular area formed on the lens during the molding process, for example it may contain all or part of a gate witness, may contain all or part of a recess formed by using a gate pin having an additional protrusion, projection or bump located on its distal end, or may contain all or part of a rough area formed on the lens.

In another example, the lens mold insert includes a fluid channel which terminates in an opening at the raised non-uniform region on the mold insert. The fluid channel serves as the location in the mold insert where a lens forming composition flows into the lens-shaped cavity as part of the process of forming an ophthalmic lens body.

In another example, the lens mold insert includes a gate pin. The gate pin can abut the raised non-uniform region to seal the opening from further fluid flow during the molding process. The gate pin optionally includes an additional projection at the distal end of the gate pin to project through the opening at the raised non-uniform region on the mold insert and into the lens-shaped cavity.

In still yet another example, a method is provided for manufacturing an ophthalmic lens comprising direct injection molding an ophthalmic lens comprising a depression, the depression containing an irregular area formed during the molding process, and processing the ophthalmic lens for packaging. Processing is understood to include at least one of the steps of demolding, delensing, cleaning, extracting, hydrating, inspecting, packaging, sterilizing, and combinations thereof. In one example, the method of manufacturing an ophthalmic lens does not require a further step of treating the irregular area on the lens formed during the molding process to make a lens surface more ophthalmically acceptably smooth after removing the ophthalmic lens body from the lens-shaped cavity.

A method is herein provided for manufacturing an ophthalmic lens through direct injection molding. The method comprises providing a first mold insert comprising a body section; said first mold insert comprising a lens forming surface, a raised non-uniform region having an opening formed through the lens forming surface, and a fluid channel passing through the body section and in fluid communication with the opening; placing the first mold insert into a mold block so that the lens forming surface of the first mold insert and the raised non-uniform region form part of a lens-shaped cavity; depositing a lens forming composition through the fluid channel and the opening so that an amount of the lens forming composition is deposited in the lens-shaped cavity. The method can further comprise the steps of curing or setting the lens forming composition to form a lens body, and removing the lens body from the lens-shaped cavity. Optionally, the method can further comprise cleaning the lens body, extracting materials from the lens body, hydrating the lens body, packaging the lens body, sealing and sterilizing the lens body in a vial or blister package, and combinations thereof.

The present disclosure describes an ophthalmic lens comprising a lens body, a front curve surface, a back curve surface, an optic zone, and a peripheral zone, wherein a depression comprising a depression bottom surface is located in the peripheral zone of the lens body and the depression bottom surface is recessed from either the front curve surface or the back curve surface of the lens body, and extends into the bulk of the lens body.

The present disclosure also describes a system for producing an ophthalmic lens through direct injection molding. The system comprises a first mold insert comprising a body section; said first mold insert comprising a lens forming surface including a raised non-uniform region, the raised non-uniform region having an opening formed through the lens forming surface located within the non-uniform region, and a fluid channel passing through the body section and in fluid communication with the opening in the non-uniform region; a mold block for retaining the first mold insert and at least one companion lens forming surface so that a lens-shaped cavity is defined by the lens forming surface of the first mold insert and the at least one companion lens forming surface, the portion of the first mold insert containing the raised non-uniform region forming part of the lens-shaped cavity; and a gate pin comprising a pin shaft and a pin tip located, at least in part, in the fluid channel for closing the opening on the projection.

These and other features and advantages of the present invention will become appreciated as the same become better understood with reference to the specification, claims and appended drawings.

DETAILED DESCRIPTION

The following disclosure will be primarily directed to contact lenses, methods of manufacturing contact lenses, contact lens mold inserts, and systems for forming contact lens bodies, including manufacturing by direct injection molding, delensing, washing, inspecting, and packaging in blister packs. In certain embodiments, the present ophthalmic lenses are hydrogel lenses, including silicone hydrogel lenses. However, it will be appreciated that embodiments of the present methods, devices, and systems can be used in the manufacturing and processing of other types of ophthalmic lenses, such as, for example, corneal inlay lenses and onlay lenses.

Figure 1:
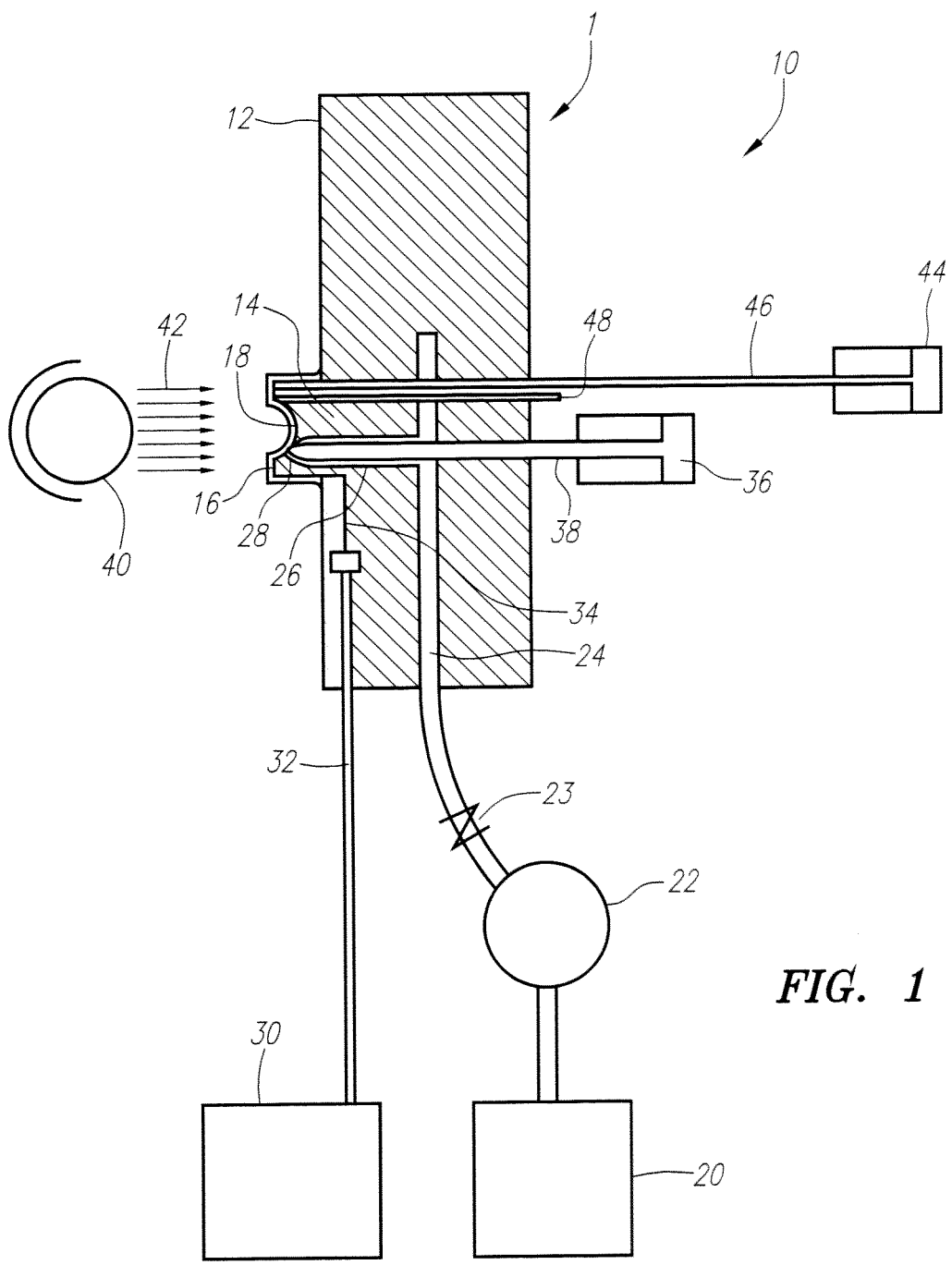
FIG. 1 is a schematic cross-sectional side view of a mold block of an injection molding machine including front and back curve mold sections.
Figure 2:
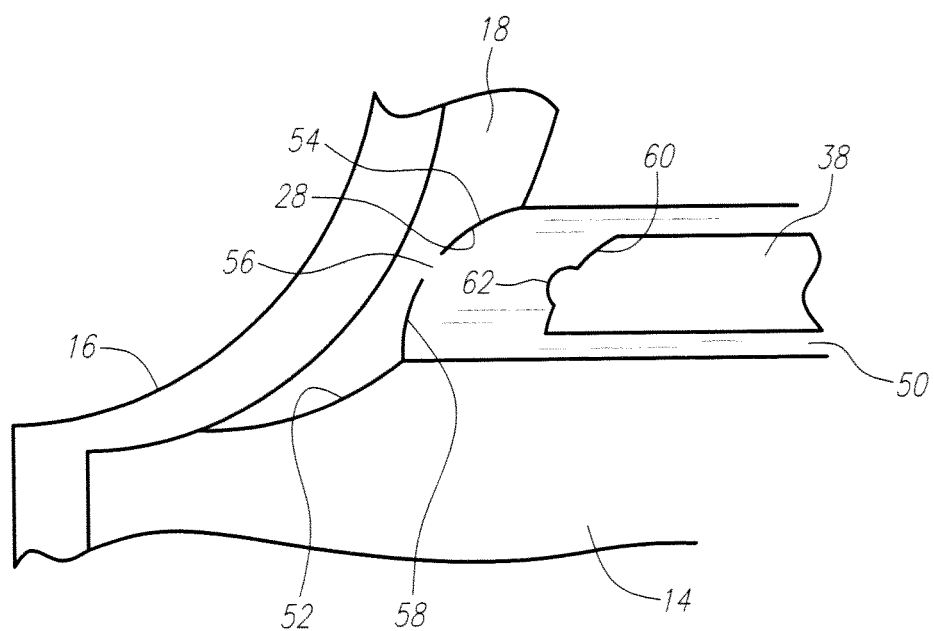
FIG. 2 is a partial exploded view of the front and back curve mold sections of FIG. 1, which also shows the lens-shaped cavity and the raised protrusion, flow channel, and gate pin present in the back curve mold section.

Referring now to FIG. 1, a schematic view of a mold assembly 1 having a mold block 10 for direct injection molding of ophthalmic lenses is shown which comprises a mold plate 12 having an integrally formed back curve cavity section or back curve mold section 14 for forming an anterior lens surface of a contact lens. The back curve mold section 14 is formed with an optical quality lens forming surface, such as by machining and polishing as understood in the art. For example, the mold plate 12 may be cast molded and subsequently machined and polished to form the lens forming surface and exterior features for mounting within the mold assembly. Optionally, the back curve mold section 14 is separately fabricated, i.e., a mold insert, and useable with the mold plate 12 when installed therewith. Still optionally, the mold plate and the mold section are machined from whole material stocks, such as from a plastic stock or from a metal stock, including an aluminum stock. In another embodiment, a plastic mold insert is first formed by injection molding and then optionally subsequently polished and/or machined to form the lens forming surface. The mold assembly 1 is configured for direct injection of a lens forming composition into the mold cavity using a combination of pressure and vacuum sources, which is further particularly described in U.S. Pat. No. 5,632,936, the contents of which are expressly incorporated herein by reference. As illustrated in FIG. 2, a raised non-uniform region 54 such as a protrusion, projection or bump is present on the lens forming surface of the back curve mold section 14, and is located in a portion of the lens forming surface used to form a peripheral zone of a lens body. In other embodiments, the raised non-uniform region 54 can be located on the front curve mold section 16, or a plurality of raised non-uniform regions 54 can be located on either the back curve mold section 14, the front curve mold section 16, or on both the back curve mold section 14 and the front curve mold section 16.

A mold member 16 with an optically finished convex surface is mated with the mold section 14 and forms a lens-shaped cavity 18 therebetween, which is defined by the optically finished convex surface of the mold member 16 and the optical quality concave surface of the mold section 14. In one example, the mold section 14 is made from a metal material, such as from aluminum, stainless steel, or a ferrous material and the mold member 16 is made from a plastic material, such as clear polystyrene or polyurethane having sufficient rigidity to withstand evacuation of the lens-shaped cavity, as further described below.

A lens forming composition from a material source or container 20 may be injected into the lens-shaped cavity 18 using a pump 22 to pump the material through the sprue 24, which then flows through the runner 26 and out the gate 28 located at the end thereof and into the lens-shaped cavity 18. A check valve 23 may be incorporated to prevent unwanted reverse fluid flow back into the material source. An area can be provided to hold extra lens forming composition in cases where the lens-shaped cavity is over filled. In a multi-cavity injection assembly, the sprue 24 connects to other runners (not shown) for direct injection into other lens cavities (not shown). In the example shown, the lens forming composition can be a silicone hydrogel lens forming composition, such as, for example, a silicone hydrogel contact lens polymerizable composition or a silicone hydrogel contact lens reactive polymerizable composition. In a particular example, the silicone hydrogel contact lens forming composition can comprise at least about 20% by weight of one or more silicone macromer, such as a reactive fluoro-containing acryloyl silicone macromer; (ii) at least about 45% by weight of one or more non-silicon containing monomer composition, such as a hydrophilic vinyl-containing monomer, an acrylic monomer, an acrylate-functionalized ethylene oxide oligomer, or combinations thereof; and optionally (iii) a diluent or non-reactive extractable component, for example a polyalkylene oxide silicone extractable component. In a more specific embodiment, the silicone hydrogel lens forming composition comprises α-ω-bis(methacryloyloxyethyliminocarboxy ethyloxypropyl)-poly(dimethylsiloxane)-poly(trifluoropropylmethylsiloxane)-poly(ω-methoxy-poly (ethyleneglycol)propylmethylsiloxane), N-vinyl-N-methylacetamide, methyl methacrylate, and triethylene glycol dimethacrylate. Other lens forming compositions, such as those disclosed in previously incorporated '553 application, may be used without deviating from the spirit and scope of the present disclosure.

In one example, the deposition of lens material into the lens-shaped cavity 18 is facilitated by a vacuum source, which may be a vacuum pump 30 located remotely from the mold plate 12. The vacuum pump 30 and the lens-shaped cavity 18 are in fluid communication with one another via a vacuum channel 32, which comprises a channel portion 34 that passes between the mold section 14 and the mold member 16 for providing a vacuum between said two elements. When vacuum is provided to the channel portion 34, lens material in the runner 26 is automatically drawn into the lens-shaped cavity 18 due to the lower pressure created by the vacuum in the lens-shaped cavity. The vacuum pressure also forces the mold member 16 to press against the back curve cavity portion 14 to form a tight perimeter around the lens-shaped cavity 18. Alternatively or in addition thereto, lens material may be deposited by positive pressure generated by the pump 22.

A drive cylinder 36, which may be a linear motor, a brushless direct current (DC) motor, a linear synchronous motor, a linear drive, a linear servo, or an actuator for changing rotary motion to linear actuation of the gate pin 38, is incorporated for opening and closing the gate 28. During an injection cycle, the drive cylinder 36 is activated to lift or retract the gate pin 38 from the gate 28, which opens into the lens-shaped cavity 18. After a sufficient amount of lens forming composition is deposited into the lens-shaped cavity 18 through the open gate, the drive cylinder 36 is activated to push the tip of the gate pin 38 against the seat at the gate 28 to close the gate and the opening of the lens-shaped cavity, as further discussed below.

In the example illustrated in FIG. 1, an ultraviolet light source 40 is provided to cure lens forming polymerizable composition contained in the lens-shaped cavity. The mold member 16 is therefore understood to be made from a clear material to permit UV rays 42 to penetrate through the wall of the mold member 16 to polymerize the lens forming polymerizable composition using UV light. Alternatively or in addition thereto, the mold plate 12 and/or the mold section 14 may be equipped with heating coils (not shown) or passages (not shown) for heated fluids to heat the mold inserts to thermally polymerize the lens forming polymerizable composition. The assembly therefore can operate to polymerize the lens forming polymerizable composition to produce ophthalmic lenses using either a light source, a thermal source, or both a light source and a thermal source. Alternatively, a lens forming reactive polymerizing composition, or a lens forming polymer composition can be used, and the use of polymerizing radiation can be omitted.

An ejector pin assembly 44 comprising an ejector rod or pin 46 can be provided to eject the mold member 16 from the back curve mold section 14 after the lens material polymerizes or solidifies. The ejector pin assembly 44 is configured to drive the ejector pin forward (to the left of FIG. 1) to separate the mold member 16. Thus, the ejector pin assembly 44 has a linear drive mechanism similar to the drive cylinder 36. A pressurized air source (not shown) may also be used in combination with the ejector pin assembly 44 to break the vacuum generated by the vacuum pump source 30. The air source (not shown) may connect to the air passage 48 formed through the mold plate 12 and terminate between the mold member and the back curve mold section 14.

Referring now to FIG. 2 in addition to FIG. 1, an enlarged partial cross-sectional side view of the mold section 16, back curve mold section 14, and gate pin 38 is shown. A fluid channel 50 is incorporated in the back curve mold section 14 and provides a path for lens forming composition to flow into the lens-shaped cavity 18 via the opening at the gate 28. The fluid channel 50 comprises a diameter that is larger than the diameter of the gate pin 38 to enable fluid flow around the annular space between the two. In one example, the diameter of the fluid channel is about 1.3 times to about 8 times larger than the diameter of the gate pin 38.

The gate 28 projects outwardly from the back curve surface 52 of the mold section 14 and embodies a partially rounded raised non-uniform region 54 having an opening 56 formed on the back curve surface. Internally of the fluid channel 50, a curved seat surface 58 is provided for mating against a corresponding curved seat surface 60 located at the distal end of the gate pin 38. The distal end of the gate pin further comprises an additional protrusion or projection 62 configured to project into the opening 56 in the raised non-uniform region 54. When the gate pin 38 is activated to advance and closes the opening of the gate 28, the projection 62 on the distal end of the gate pin projects into the opening 56 to seal the perimeter of the opening from further lens forming composition flow from the fluid channel 50. The projection on the gate pin 62 is configured to cut off the lens forming composition that flows into the lens-shaped cavity 18 from the lens forming composition supply located in the fluid channel 50. As further discussed below, this effectively reduces and possibly eliminates any potential gate witness from forming on the cured ophthalmic lens. Alternatively, the projection 62 on the gate pin 38 can be eliminated and the rounded end of the gate pin 38 can abut the curved seat surface 58 to seal the opening 56 within the raised non-uniform region 54.

The present apparatus and system is therefore understood to include a lens-shaped cavity 18 formed in a mold block 10 of an injection molding assembly 1 comprising a raised non-uniform region 54 that defines part of the lens-shaped cavity. In a further example of the present apparatus and system, an opening 56 is formed on the non-uniform region 54 located on a concave lens forming surface 52 of the lens-shaped cavity. In a still further example of the present apparatus and system, a fluid channel 50 is formed in a mold section 14 and terminates at the non-uniform region 54. The fluid channel 50 and the lens-shaped cavity 18 are in fluid communication with one another via the opening 56 formed in the non-uniform region 54. The apparatus also includes a mold section 14 comprising a lens forming surface 52, a raised non-uniform region 54 forming part of the lens forming surface 52, an opening 56 formed in or on the non-uniform region 54, and a fluid channel 50 in fluid communication with the opening 56.

Figure 3:
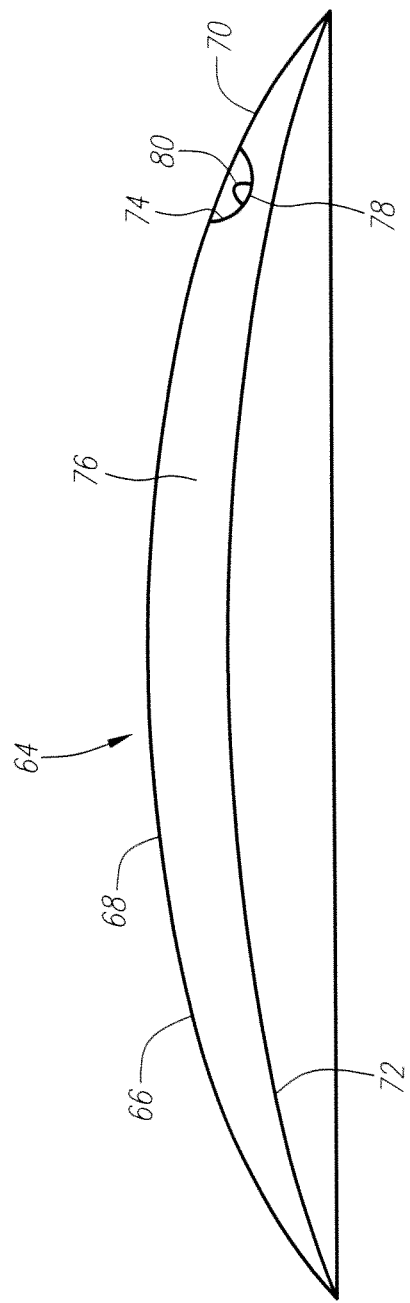
FIG. 3 is a cross-sectional side view of an ophthalmic lens produced from the assembly of FIG. 1.

FIG. 3 is a schematic cross-sectional side view of an ophthalmic lens 64 formed by the injection molding apparatus and method of FIGS. 1 and 2. The ophthalmic lens 64 comprises a front surface 66 and a back surface 72 having an optical zone 68 and a peripheral zone 70 as understood in the art. A depression 74 is located in the peripheral zone 70 and is formed as a negative of the raised partially rounded non-uniform region 54 (FIG. 2) of the back curve mold section 14. The depression 74 extends partially into the bulk of the lens body or lens thickness 76 of the ophthalmic lens and has a depression bottom surface 78 that is below the front curve surface 66. The depth of the depression (not shown) is therefore less than the thickness of the lens at the location of the depression. As such, a gate witness 80, if any, that is formed when the gate closes during the injection molding process, is hidden within the depression 74 and its upper or highest most point can be below the front curve surface 66 of the ophthalmic lens 64. However, by using the gate pin 38 of FIG. 2, the gate witness 80 is minimized and may even embody a recess within the depression 74. In the event a gate witness is formed that projects upwardly from the depression bottom surface 78, it may optionally be minimized using a post-cure process, such as by ablating it with a laser of a wavelength that is absorbed by the polymer used to form the lens. Similarly, any other irregular area formed on the lens surface near the location of the gate, such as, for example, a recess or rough area, can be hidden within the depression 74 below the front curve surface 66. In other examples, the depression 74 can be formed on the back curve surface 72, and the irregular area can be hidden within the depression 74 below the back curve surface 72.

Thus, the present injection molding system and method includes a mold section and mold member that combine to form a lens-shaped cavity with a non-uniform region, such as, for example, a raised protrusion, projection or bump formed in the convex lens forming surface, the concave lens forming surface, or both lens forming surfaces of the mold section and mold member, resulting in the lens-shaped cavity formed by the mold section and the mold member having one or more depressions, the one or more depressions being the negative image of the non-uniform region on a mold insert used to mold the lens body. In one example, the non-uniform region is located on a concave side of the lens-shaped cavity. In another example, the non-uniform region is located on a convex side of the lens-shaped cavity. In yet another example, a non-uniform region is located on both the concave side and the convex side of the lens-shaped cavity. In yet another example, the non-uniform region comprises a raised region that protrudes or projects upwardly from the curved convex surface or from the curved concave surface. In still yet another example, the non-uniform region is located along a peripheral zone of the lens-shaped cavity so that the depression formed by the non-uniform region is located in a peripheral zone of an ophthalmic lens that forms from a lens forming composition injected into the lens-shaped cavity. The depression may be located in the peripheral zone of the front surface, the peripheral zone of the back surface, or a peripheral zone of both the front surface and the back surface of the polymerized lens.

The present methods further include the steps of forming a depression in an ophthalmic lens, the depression comprising a depression bottom surface that is recessed from the lens exterior surface. As used herein, the lens exterior surface can be a curved planar surface of the lens front curve surface or of the lens back curve surface. In a particular embodiment, the depression is created by forming a raised non-uniform region on the mold insert or mold member used to mold the lens, the raised non-uniform region protruding or projecting into a lens-shaped cavity defined by the mold insert and the mold section, and depositing lens forming composition into the lens-shaped cavity to create a negative of the non-uniform region on a surface of the lens body. The method can further include application of a gate pin so that the tip of the gate pin abuts the non-uniform region to close fluid communication between a fluid channel containing lens forming composition and the lens-shaped cavity. Thus, any gate witness that may form as a bi-product of the injection molding process can be hidden inside the depression.

The present invention further relates to manipulation of the gate witness or remnant of the gate witness if, for example, it has been ablated by a laser. The invention also relates to manipulation of the depression or combinations of the depression, the gate witness, and the remnant. For example, the depression, the gate witness, and/or the remnant may be used as, or incorporated into, an orientation mark for a toric lens. The depression, the gate witness, and/or the remnant may also be used as or incorporated into an information mark, a diagnostic mark, an inversion mark, a branding mark, another type of mark, or combination thereof. The depression, the gate witness, and/or the remnant may further be used as part of a shape or symbol indicative of a manufacturer's brand or mark.

According to the present method, apparatus, and system, a hydrogel contact lens, including a silicone hydrogel contact lens, is produced through direct injection molding and wherein the front curve surface, the back curve surface or both the front curve surface and the back curve surface of the lens has a depression located within a peripheral zone of the lens. The present method, apparatus, and system further include provisions for simultaneously injecting a plurality of lens cavities in a multi-cavity mold. The lenses produced therefrom each comprise a depression formed on either the front curve surface, the back curve surface, or both the front curve surface and the back curve surface of the lens.

Figure 4:
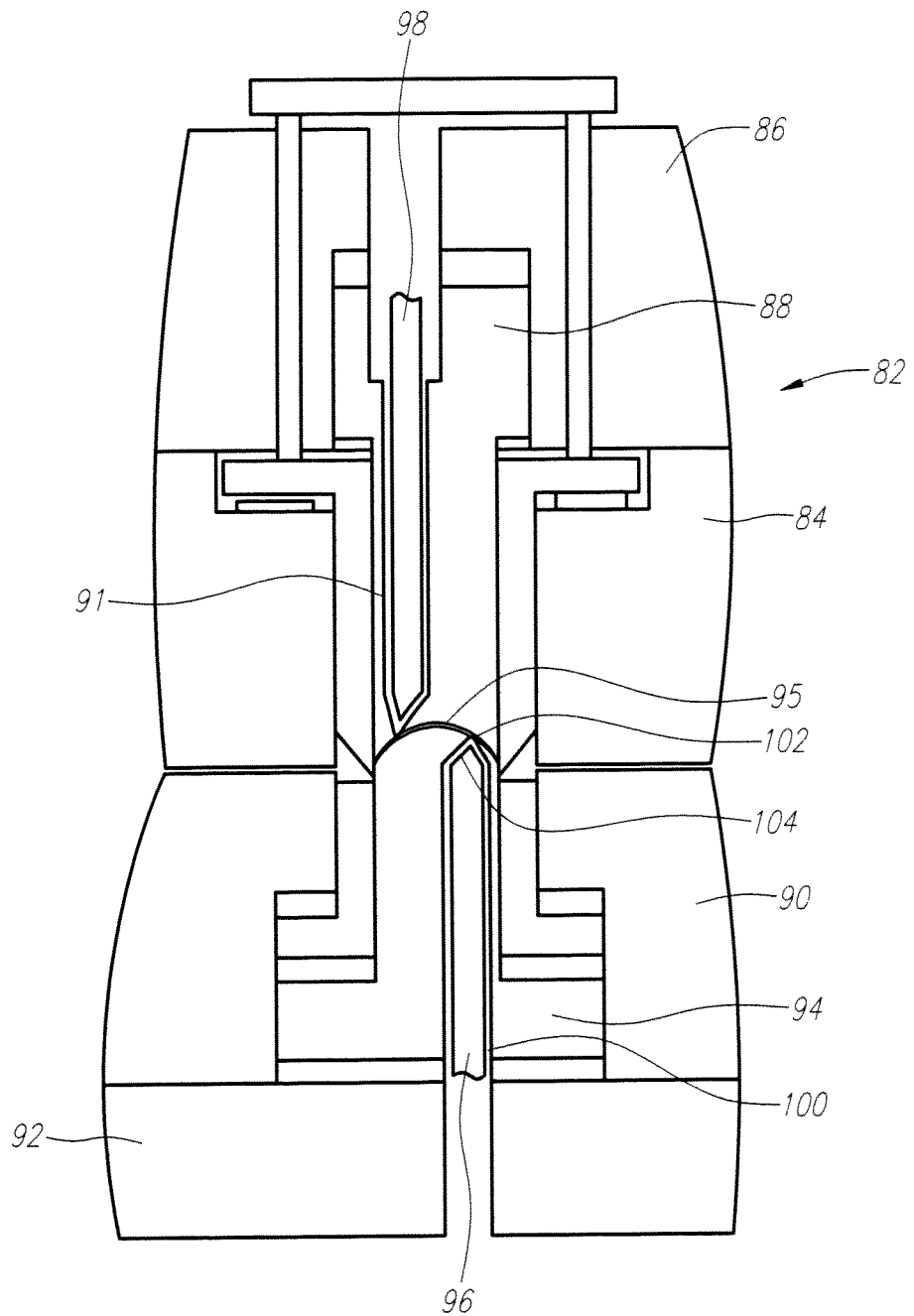
FIG. 4 is a schematic cross-sectional side view of a mold block of an injection molding machine provided in accordance with the present invention.

FIG. 4 is a schematic cross-sectional side view of a mold section or mold block 82 of an injection molding machine provided in accordance with the present invention. Broadly speaking, the mold block 82 comprises an upper mold plate 84 and an upper retaining plate 86 for retaining a front curve insert 88 and a lower mold plate 90 and lower retaining plate 92 for retaining a back curve insert 94. Further discussions of the mold block 82 are discussed in U.S. Pat. No. 5,982,682, which are expressly incorporated herein by reference.

The front curve insert 88 has an optical quality concave surface for forming a front curve surface of an ophthalmic lens. The back curve insert 94 has an optical quality convex surface for forming a back curve surface of an ophthalmic lens. The front and back curve inserts 88, 94 together defines a lens-shaped cavity 95 for forming an ophthalmic lens. As shown, the front curve insert 88, the back curve insert 94, or both inserts may be modified to incorporate a gate pin 96/98. The gate pin 96/98 may be attached to a drive cylinder (not shown) in the manner and fashion discussed above with reference to FIG. 1. Further discussions below with reference to one of the gate pins 96 are understood to apply equally to the other gate pin 98.

A fluid channel 100 surrounds the gate pin 96 and is in fluid communication with the lens-shaped cavity 95 via an opening at the end of the gate 102. As shown, the fluid channel 100 passes through the mold insert 94 as well as part of the retaining plate 92. In other embodiments, the fluid channel also passes through part of the lower mold plate 90. As with the assembly of FIG. 1, a raised non-uniform region is incorporated at the end of the fluid channel 100 and projects into the lens-shaped cavity 95. Thus, the convex surface of the back curve insert 94 has a non-uniform region formed thereon that forms part of the lens-shaped cavity. Internally of the fluid channel 100, a frusto-conical seat surface 104 is provided for mating against a corresponding frusto-conical surface located at the distal end of the gate pin 96. The surface located at the distal end of the gate pin 96 can take many forms, including but not limited to frusto-conical, flat end cylindrical, "ball end", or any other shape forming a seal between the opening between the fluid channel 100 and the lens-shaped cavity. Optionally, the distal end of the gate pin can incorporate a projection, similar to the projection 62 of FIG. 2, for projecting through the opening at the gate to seal the opening and cut off fluid flow from the fluid channel and the lens-shaped cavity 95. The projection on the end of the gate pin 96 can also take many forms, including but not limited to frusto-conical, flat end cylindrical, "ball end", or any other shape forming a seal between the opening between the fluid channel 100 and the lens-shaped cavity. The location of the gate corresponds to a peripheral zone of an ophthalmic lens that forms from the lens-shaped cavity herein described.

In another example, the seat internally of the fluid channel 100 has a cone shape with a cone top section removed to form an opening. The tip of the gate pin 96 has a corresponding cone shape for seating against the internal seat. Thus, when the gate pin 96 is activated to close the gate, the tip of the gate pin is configured to enter the opening and into the lens-shaped cavity 95. Thus, when an ophthalmic lens forms from the disclosed mold block 82 cures, a depression having a cone shaped recess is formed in the peripheral zone of the lens. The present mold block 82 demonstrates the ability to form an ophthalmic lens comprising a depression on the front curve surface, the back curve surface of the ophthalmic lens, or both. When a single depression is desired, either the front curve insert 88 or the back curve insert 94 is configured with a solid body section 91, i.e., without a fluid channel, and a continuous lens forming surface without a raised non-uniform region.

Figure 5:
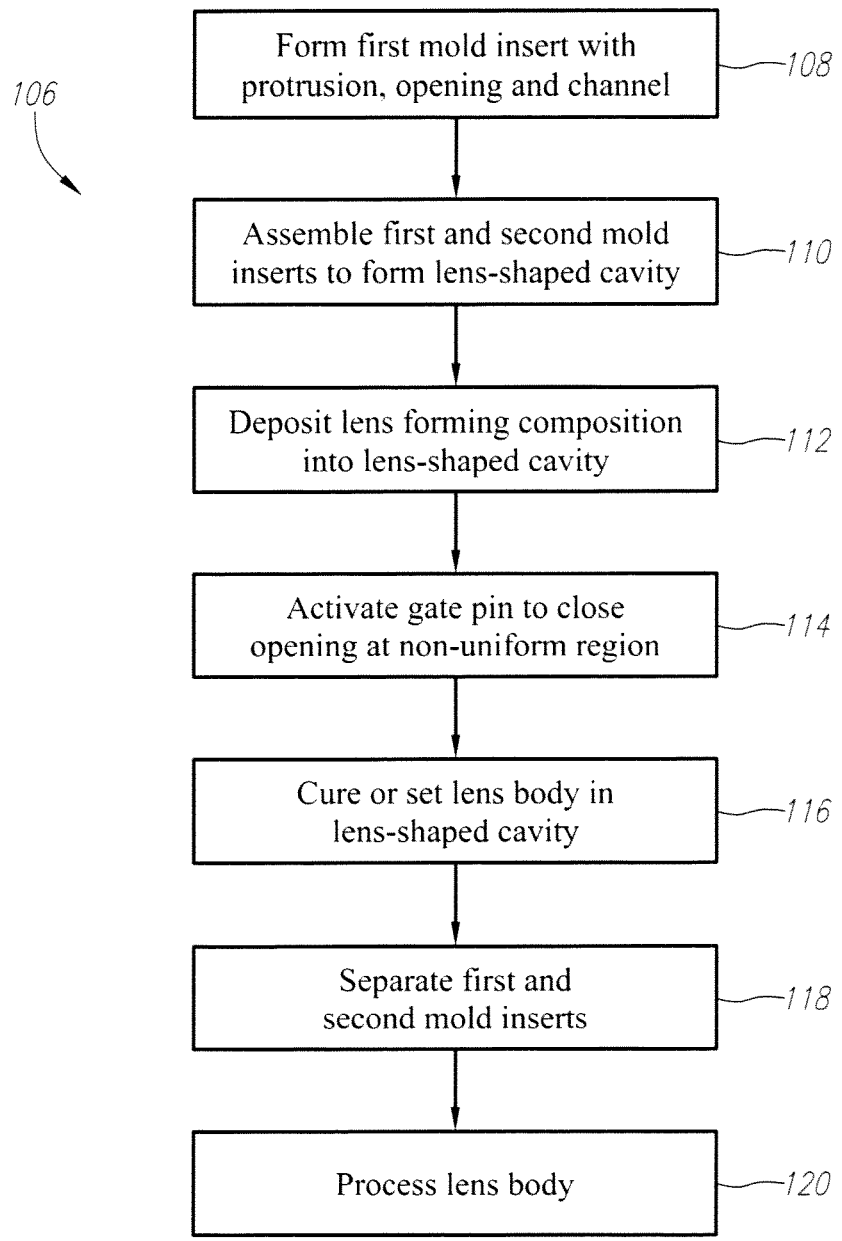
FIG. 5 is a flow diagram of a method for forming an ophthalmic lens having a depression from a mold assembly.

FIG. 5 is a schematic flow chart depicting a method for forming an ophthalmic lens 106 provided in accordance with the present disclosure. The method comprises a mold insert forming step 108. In particular, a first mold insert is formed with a lens forming surface, a fluid channel formed through, at least in part, the first mold insert and terminates in a raised non-uniform region having an opening that forms part of a gate for lens forming composition flow. The opening resides along or in-line with the lens forming surface so that when an ophthalmic lens is manufactured using the first mold insert, the raised non-uniform region with the opening forms a depression within the peripheral zone of the lens.

The first mold insert is then installed in a mold block of an injection molding machine along with a second mold insert in step 110. The second mold insert comprises a lens forming surface. When the two inserts are mated together inside a mold block, the two inserts define a lens-shaped cavity therebetween. In one example, the first mold insert has a convex lens forming surface for forming a back curve of an ophthalmic lens. In another example, the first mold insert has a concave lens forming surface for forming a front curve of an ophthalmic lens.

Lens forming composition is then made to flow through the fluid channel of the first mold insert and out through the opening at the gate at step 112. In one example, the lens forming composition may be pressurized and allowed to flow through the fluid channel. In another example, the lens forming composition may be heated and allowed to flow through the fluid channel. The two mold inserts can be provided with vents for venting so as not to create a dead head in the lens-shaped cavity which can prevent proper lens material flow. A vacuum source may optionally be used to pull lens forming composition into the lens-shaped cavity. In a particular embodiment, the lens forming composition is injected at room temperature and is subsequently activated to polymerize, as further discussed below. In another example, the lens forming composition is heated from room temperature to about 25° C. to about 145° C. in the barrel section of the lens injection assembly before being injected into the lens-shaped cavity. The temperature to which the lens forming composition is heated depends on, among other things, the particular composition used for the lens forming composition.

Following deposition of the lens forming composition into the lens-shaped cavity, the drive cylinder can be activated to move the gate pin against the raised non-uniform region formed in the flow channel at step 114. The gate pin is moved until the distal end of the pin contacts the gate seat to close the opening of the gate and terminate fluid communication between the lens-shaped cavity and the fluid channel. In a particular embodiment, the gate pin comprises a raised projection at the distal end for projecting in through the opening and into the lens-shaped cavity. At the same time, the gate pin seals against the seat. Consequently, an ophthalmic lens that forms from the present method has a depression and a recess formed within the depression, which are negatives of the raised non-uniform region located in the mold section and the projection located at the end of the gate pin. However, the gate pin can terminate in a round or smooth end surface so that it does not project in through the opening of the gate, and thus does not produce a recess formed in the depression on the lens surface.

The lens is formed from the lens forming composition at step 116. When the lens forming composition comprises a lens forming reactive polymerizable composition, forming the lens may comprise allowing the lens forming reactive polymerizable composition to sit in the lens-shaped cavity for a period of time until the reactive polymerizable composition has reacted and polymerized to a level that the resulting lens body is able to maintain the shape of the lens-shaped cavity after being removed from the lens-shaped cavity. When the lens forming composition comprises a thermoplastic or thermosetting material, forming the lens may comprise cooling the lens forming composition adequately that the resulting lens body is able to maintain the shape of the lens-shaped cavity. When the lens forming composition comprises a lens forming polymerizable composition, forming the lens may comprise applying radiation (e.g., heat or UV light) to the lens forming polymerizable composition effective to polymerize the material to a level that the resulting lens body is able to maintain the shape of the lens-shaped cavity.

When a lens forming polymerizable composition is used to form a lens, in order to polymerize the lens material, heat, UV light, or another form of electromagnetic radiation can be applied to the lens material at step 116. This causes the lens material to polymerize and form in the shape of the lens-shaped cavity. In the embodiment that uses UV light or irradiation to cure or polymerize the lens forming polymerizable composition, the first mold insert, the second mold insert, or both, can be made from a light permeable material. That is, at least a portion of the mold insert material must be capable of allowing light of certain wavelengths to pass through the mold insert in order to activate a lens forming polymerizable composition comprising a light-activated initiator. Similarly, at least a portion of the mold insert material must be capable of allowing heat to pass through the mold insert in order to activate a lens forming polymerizable composition comprising a heat-activated initiator. In one embodiment, the lens forming polymerizable composition is cured or polymerized in accordance with the teachings of U.S. Pat. Nos. 7,550,519 and 7,201,481 and U.S. Publication No. 2009/0264553.

At step 118, the first and second mold inserts are separated from one another following curing, polymerization or setting of the lens forming composition. In one example, an ejector pin assembly is used to force the first and second mold sections to separate from one another. In a particular embodiment, the formed lens remains attached to one of the mold inserts. The mold insert with the lens still attached is then processed. The processing of the mold insert with the lens still attached can include delensing the lens, i.e., releasing the lens from the one mold insert to which it remained attached. After delensing, the lens can be washed, inspected, packaged in a blister package, sealed in the blister package, sterilized in the blister package, and combinations thereof. The ophthalmic lens formed from the present invention is understood to include a depression within a peripheral zone of the lens. In one example, the depression can have an irregular area such as a gate witness, a remnant, a depression, or a recess located within it. By hiding the irregular area within the depression, the irregular area is prevented from affecting the ophthalmic acceptability of the surface of the lens or the wearer's use of the lens, such as the comfort of wearing the lens.

As disclosed herein, the present invention is directed to a method for producing an ophthalmic lens from direct injection molding into a lens-shaped cavity of a mold block. The method comprising forming a first mold insert from a plastic or a metal material, wherein the mold insert comprises a lens forming surface and a fluid channel for injecting lens forming composition to the lens forming surface. The method further comprising creating a raised non-uniform region on the lens forming surface of the mold insert so that the non-uniform region projects above a curve lens forming surface formed on the first mold insert. In a particular embodiment, the non-uniform region is a partially rounded protrusion or projection. In another embodiment, the non-uniform region is a cone-shaped projection with its cone tip removed to form an opening. Other shapes are possible without deviating from the scope and spirit of the present invention provided the non-uniform region of the mold insert produces a depression having a depression bottom located below the exterior lens surface. The present method also includes the step of forming a second mold insert from a plastic material or a metal and installing the first and second mold inserts into a mold block to form a lens-shaped cavity between the two inserts and having one or more non-uniform regions form part of the lens-shaped cavity formed between the two inserts.

Another feature of the present invention is a method for injecting a quantity of lens forming composition into a lens-shaped cavity of a mold block. The lens forming composition flows through a flow channel and exits out through an opening formed at a raised non-uniform region on one of the mold surfaces forming the lens-shaped cavity therebetween. The method further comprises the step of stopping the flow of lens forming composition by activating a gate pin so that the distal end of the gate pin abuts a seat formed in the flow channel. The method further comprises the step of curing, polymerizing or setting the lens forming composition and then removing the cured, polymerized or set lens body from the lens-shaped cavity and processing the same, which may include demolding the lens body, delensing the lens body, washing the lens body, packaging the lens body, sealing and sterilizing the lens body in the primary packaging, and combinations thereof.

A still further feature of the present method, apparatus, and system is the use of gate types that automatically trim the gate without the need for a secondary operation. Known prior art gate types that automatically trim the gate includes a pin gate, a submarine gate, a hot runner gate, and a valve gate, such as the pin gate discussed herein.

Although the disclosure herein refers to certain specific embodiments, it is to be understood that these embodiments are presented by way of example and not by way of limitation. The intent of the foregoing detailed description, although discussing exemplary embodiments, is to be construed to cover all modifications, alternatives, and equivalents of the embodiments as may fall within the spirit and scope of the invention as defined by the claims.

What is claimed is:

1. A method of manufacturing a contact lens, comprising:
providing a first mold insert comprising a body section; said first mold insert comprising a lens forming surface including a raised non-uniform region having an opening formed through the lens forming surface in the location of the raised non-uniform region, and a fluid channel passing through the body section and in fluid communication with the opening;
placing the first mold insert into a mold block so that the lens forming surface of the first mold insert and the raised non-uniform region form part of a lens-shaped cavity;
providing a lens forming composition through the fluid channel and the opening so that an amount of the lens forming composition is deposited in the lens-shaped cavity;
allowing the lens forming composition to form a contact lens body retaining the shape of the lens-shaped cavity;
removing the contact lens body from the mold block and the mold insert;
washing the contact lens body;
inspecting the contact lens body;
placing the contact lens body in a package with a packaging solution;
sealing the package containing the contact lens body and the packaging solution; and
sterilizing the package containing the contact lens body and the packaging solution to produce a finished contact lens.

2. The method of claim 1, wherein the raised non-uniform region of the first mold insert is configured to form a depression in a peripheral zone of a contact lens body.

3. The method of claim 1, wherein the contact lens comprises a silicone hydrogel contact lens.

4. The method of claim 3, wherein the step of washing the contact lens body comprises cleaning the contact lens body, extracting the contact lens body, hydrating the contact lens body, and combinations thereof, using an aqueous solution free of a volatile alcohol.

5. A method for forming an ophthalmic lens through direct injection molding comprising:
forming a first mold insert comprising a body section; said first mold insert comprising a lens forming surface including a raised non-uniform region in a peripheral zone of the lens forming surface, the raised non-uniform region having an opening formed through the lens forming surface in the location of the raised non-uniform region, and a fluid channel passing through the body section and in fluid communication with the opening;
placing the first mold insert into a mold block so that the lens forming surface of the first mold insert and the raised non-uniform region form part of a lens-shaped cavity;
providing a lens forming composition through the fluid channel and the opening so that an amount of the lens forming composition is deposited in the lens-shaped cavity; and
allowing the lens forming composition to cure, polymerize or set to form a lens body retaining the shape of the lens-shaped cavity.

6. The method of claim 1, wherein the lens forming composition comprises a lens forming reactive polymeriziable composition, a lens forming polymeriziable composition, or a lens forming polymer composition.

7. The method of claim 1, wherein the lens forming composition comprises a silicone hydrogel lens forming composition.

8. The method of claim 5, wherein the step of allowing the lens forming composition to cure, polymerize or set further comprises forming a depression on the exterior surface of the lens body, the depression being the negative of the non-uniform region.

9. The method of claim 8, wherein the step of providing a lens forming composition through the fluid channel and the opening, or the step of allowing the lens forming composition to cure, polymerize or set, further comprises forming an irregular area on a side or a bottom of the depression.

10. The method of claim 9, wherein the exterior surface of the lens body is more ophthalmically acceptable than an exterior surface of a second lens body formed in a lens-shaped cavity without a raised non-uniform region, and without forming a depression on an exterior surface of the second lens body but having an irregular area located directly on a front or back curve surface of the second lens body.

11. The method of claim 1, wherein the raised non-uniform region is sized and shaped to provide a depression in the contact lens body that can accommodate a gate witness.

12. The method of claim 11, wherein the contact lens body has an anterior surface and a posterior surface and wherein the gate witness projects from a surface of the depression and is recessed from the anterior surface or the poster surface.

13. The method of claim 5, wherein the raised non-uniform region is sized and shaped to provide a depression in the lens body that can accommodate a gate witness.

14. The method of claim 13, wherein the lens body has an anterior surface and a posterior surface and wherein the gate witness projects from a surface of the depression and is recessed from the anterior surface or the poster surface.

* * * * *